Figure 1:
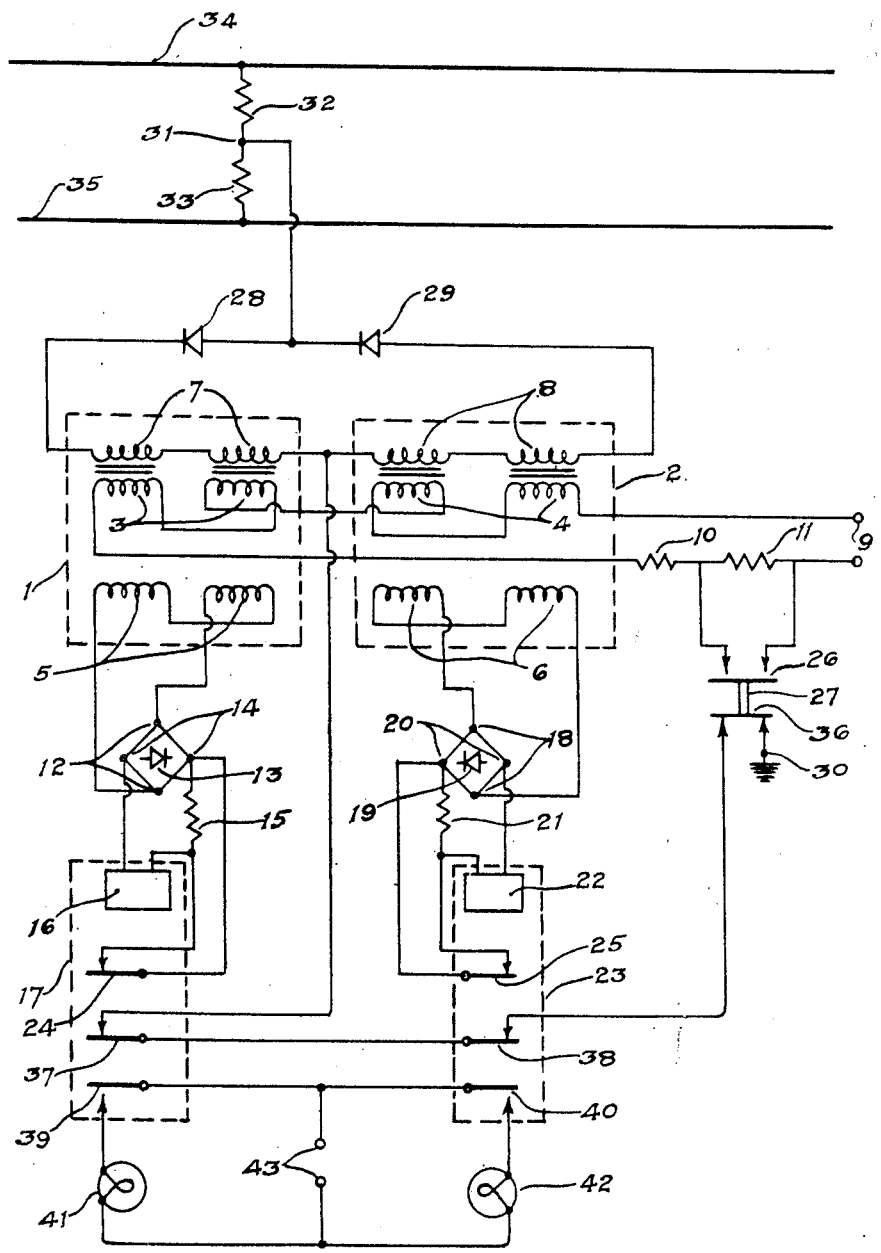

INVENTORS
Kenneth Gordon King and
Harry Duckitt.
BY W. L. Stout

THEIR ATTORNEY

INVENTORS
Kenneth Gordon King and
Harry Duckitt.
BY
W. L. Stout.

THEIR ATTORNEY

2,700,125

APPARATUS FOR THE DETECTION OF EARTH FAULTS IN TWO-WIRE ELECTRIC SUPPLY SYSTEMS

Kenneth Gordon King and Harry Duckitt, London, England, assignors to Westinghouse Brake and Signal Company Limited, London, England Application May 3, 1952, Serial No. 285,974

Claims priority, application Great Britain May 8, 1951

2 Claims. (Cl. 317—137)

This invention relates to apparatus for the detection of earth faults in two-wire electric supply systems in which neither line wire is normally earthed and has for its object the provision of apparatus of this kind which is reliable and sensitive in action.

According to the invention apparatus of the kind described comprises two electro-magnetically operated devices adapted to cause the operation of indication and/or control means and each having a control or operating winding connected between at least one of the line wires and an earth connection in circuit with a polarising rectifier, whereby an earth fault on one line causes current to flow in the control or operating winding of one of the devices, whilst an earth fault on the other line wire causes current to flow in the control or operating winding of the other device, thereby causing an indication to be given of the line wire on which the fault occurs.

Preferably the devices are magnetic amplifiers the outputs of which are arranged to cause the operation of the indication and/or control means.

If the supply system is a direct current system, the two line wires may be bridged by a resistor between the midpoint of which and the earth connection are connected two parallel connected circuits each including the control winding or windings of one amplifier in series with one of the polarising rectifiers.

If the supply system is an alternating current supply system, the control winding or windings of one amplifier may be connected in series with one polarising rectifier between one line wire and the earth connection, whilst the control winding or windings of the other amplifier is connected in series with the other polarising rectifier between the other line wire and the earth connection, the two rectifiers being poled the same way. Preferably a rectifier or a condenser is connected in parallel with the control windings of each of the amplifiers for the purpose of maintaining the flow of current in those windings during the half cycle during which the associated polarising rectifier is not conducting.

Preferably, the amplifiers are provided with primary windings and secondary windings, the primary windings being energised from a source of alternating current through a series connected resistor the resistance of which is such that the current taken by them is substantially independent of the current flowing in the control windings.

The output of each amplifier may be employed to maintain normally energised a relay associated therewith, the release of which inserts a resistance into its energising circuit, whereby the relay remains released until the output of its associated amplifier is increased.

Alternatively, when such a high degree of sensitivity is not required, the two electro-magnetically operated devices may be direct current relays. In addition to an operating winding, each relay may have a holding winding short circuited by a normally closed contact of the relay but adapted to be energised from a suitable source to maintain the relay energised, once it has been energised as the result of a fault, until a manually operated contact is operated to cause the relay to release.

Figure 2:
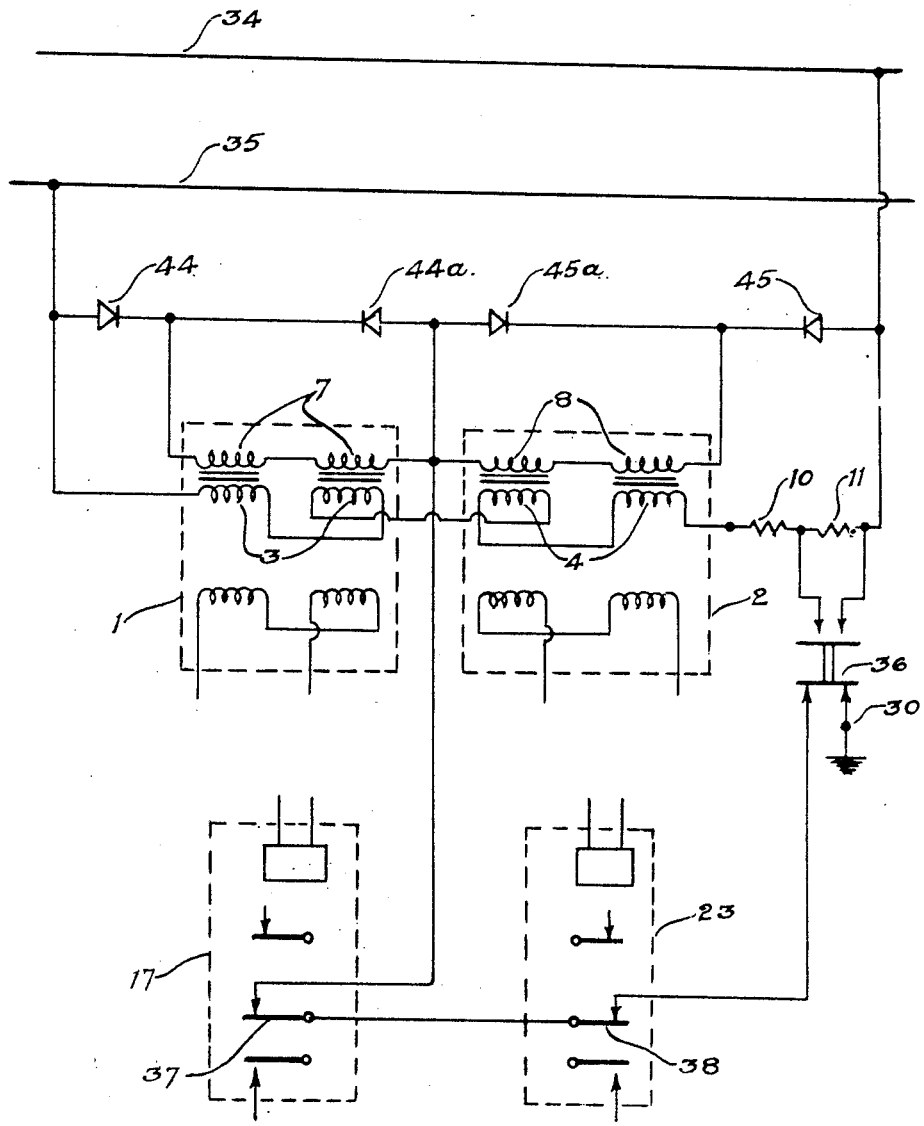

The invention is illustrated by way of example in the accompanying drawings,

Figure 1 showing one arrangement for the detection of earth faults on a direct current supply system using two magnetic amplifiers in accordance with the present invention, Fig. 2 showing a modification for the detection of earth faults on an alternating current supply system.

Figure 3:
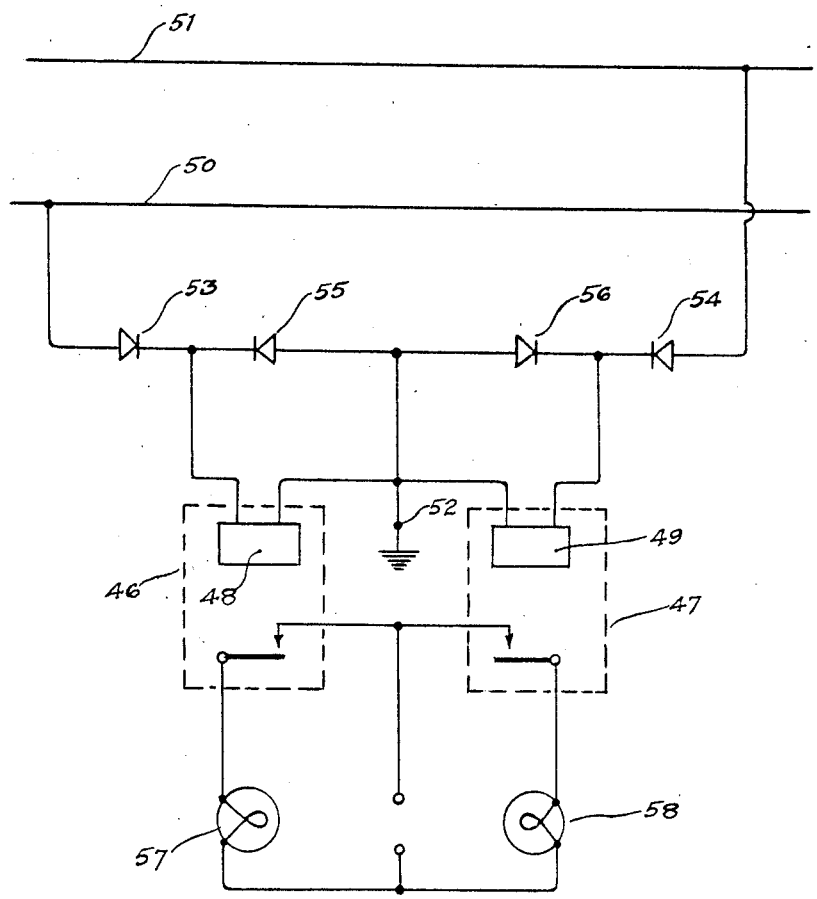
Figure 4:
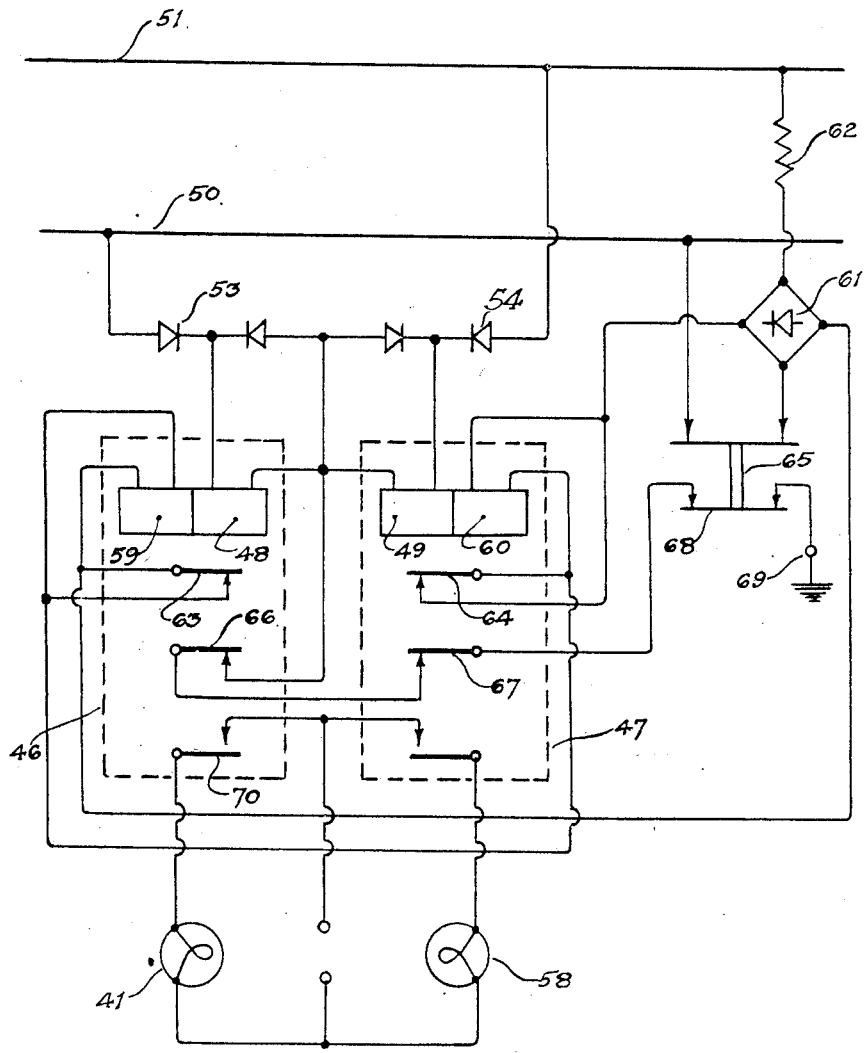

Figure 3 showing an arrangement for the detection of earth faults using two electromagnetic relays, and Figure 4 showing a modification for the detection of earth faults using electro-magnetic relays each provided with an additional holding coil.

Referring to Figure 1, each of two magnetic amplifiers 1 and 2 has two separate cores on which are wound alternating current primary windings 3 and 4, and secondary windings 5 and 6 and direct current control windings 7 and 8 respectively. The primary windings 3 and 4 are connected, all in series to terminal 9 of an alternating current supply in series with two resistors 10 and 11 which keep the current in this circuit practically independent of any control current applied to the control windings 7 and 8 of the magnetic amplifiers. The secondary windings 5 are connected across the alternating current terminals 12 of a bridge rectifier 13, the D. C. terminals 14 of the rectifier being connected in series with a resistance 15 across the operating winding 16 of a relay 17. Similarly the secondary windings 6 are connected across the alternating current terminals 18 of a bridge rectifier 19 the D. C. terminals 20 of the rectifier being connected in series with a resistance 21 across the operating winding 22 of a relay 23.

The resistors 15 and 21 are shunted respectively by front contacts 24 and 25 on the relays, so that if for instance the relay 17 has released because of a control current in the associated magnetic amplifier 1, or a failure of the alternating current supply across the terminals 9, it will not pick up again until the total resistance in its supply circuit is momentarily reduced, which is done by short-circuiting the resistor 11 through the front contact 26 of a "reset" push button 27.

The control windings 7 and 8, in series with polarising rectifiers 28 and 29 are connected between earth terminal 30 and the junction 31 between two equal resistors 32 and 33 connected in series across the line wires 34 and 35, the circuits including a back contact 36 on the "reset" push-button 27 a front contact 38 on relay 23 and a front contact 37 on relay 17, the latter contacts being for the purpose of isolating the supply across the terminals 9 from earth in the event of a fault.

Contacts 39 and 40 on the relays 17 and 23 can of course be used in any desired indication circuits to connect, for example, a pair of warning lamps 41 and 42 respectively across a suitable source of power connected to a pair of terminals 43.

Should an earth fault occur on one of the line wires, the resulting leakage current will flow through the control windings of one amplifier or the other, determined by the polarising rectifiers and the line on which the fault occurs. Supposing for the purpose of explanation that the line wires 34 and 35 are connected to the positive and negative terminals respectively of a main direct current supply generator and an earth fault develops on the wire 34, then the resulting leakage current will flow from the generator through the line wire 34 and thence through the earth fault contact, the earth terminal 30, the back contact 36 of the reset push-button, the relay front contacts 38 and 37, the direct current control winding 8 of the magnetic amplifier 2, the polarising rectifier 29, the resistor 33 and the line wire 35. Accordingly the current through the secondary windings 6 of the magnetic amplifier 2 will fall in value and the associated relay 23 is released, contact 40 of this relay closing to complete the energising circuit for the warning lamp 42.

On the other hand should an earth fault develop on the line wire 35, the resulting leakage current will flow from the generator through the line wire 34 and thence through the resistance 32, the polarising rectifier 28, the direct current control winding 7 of the magnetic amplifier 1, the relay front contacts 37 and 38, the back contact 36 of the reset push-button, the earth terminal 30, the earth fault contact and the line wire 35. Accordingly the current through the secondary winding 5 of the magnetic amplifier 1 will fall in value and the associated relay 17 is released, contact 39 of this relay closing to complete the energising circuit for the warning lamp 42. It will be evident that this arrangement has the limitation that it cannot detect a symmetrical fault, that is to say a leakage to earth on both lines of equal resistance.

The arrangement described in the foregoing may, if desired, be used with alternating current lines but, in that case, an earth fault on either line would result in the supply of current to the control windings of both amplifiers on alternate half cycles, resulting in the release of both relays. There is thus no means of indicating upon which line the fault has occurred, whilst a symmetrical fault would again go undetected.

Referring to Figure 2 which shows the arrangement modified for the protection of an alternating current supply system the two resistors 32 and 33 connected across the direct current line wires in Figure 1 are dispensed with and the control windings 7 and 8 of the two amplifiers 1 and 2 are connected directly to the line wires 34 and 35 through polarising rectifiers 45 and 44 respectively. The polarising rectifiers 44 and 45 are poled the same way, that is to say in such a manner as to permit the flow of current from the line wire 34 to the control winding 8 and from the line wire 35 to the control winding 7 in the same direction. Suitable rectifiers 44a and 45a are connected across the control windings 7 and 8, of the amplifiers each rectifier being so poled as to maintain the flow of current through the windings during the half cycle when the associated polarising rectifier does not conduct. These rectifiers 44a and 45a sometimes termed "free-wheeling" rectifiers, may be replaced by condensers, if desired. The remainder of the circuit may be identical with that described above in connection with the direct current line wires but, in this case, the primary windings 3 and 4 of the amplifiers are connected in series with the two resistors 10 and 11 across the line wires 34 and 35 and are energised from the same alternating current supply as feeds the line wires which the apparatus is protecting.

As in the previous embodiment should an earth fault occur on the line wire 34, during one half of its alternating current cycle leakage current will flow from the line wire 35 through the polarising rectifier 44, the control winding 7, the relay front contacts 37 and 38, the back contact 36 of the reset push button, the earth terminal 30, the earth fault contact and the line wire 34. Accordingly, the relay 17 is released to complete the energising circuit for the associated warning lamp. On the other hand should the earth fault occur on line wire 35, during one half cycle of its alternating current cycle the resulting leakage current will flow from the line wire 34 through the polarising rectifier 45, the control winding 8, the relay front contacts 37 and 38, the back contact 36 of the reset push button, the earth terminal 30 the earth fault contact and the line wire 35. Accordingly the relay 23 is released to complete the energising circuit for the other warning lamp.

This circuit gives a greater sensitivity than the direct current circuit, for the same supply voltage, and also has the great advantage that, whereas in the direct current system simultaneous and equal faults on both lines (such as the earthing of a centre tap on a load) cannot be detected, the alternating current circuit will detect a fault on either line or both, simultaneously.

In the event of a simultaneous and equal earth fault on both lines it can be seen that during one half of the alternating current cycle the polarising rectifier 44 will conduct to release the relay 17 and during the succeeding half cycle the polarising rectifier 45 will conduct to release the relay 23, both warning lamps being thus illuminated under these conditions.

Referring to Figure 3 which shows an arrangement for the protection of an alternating current supply system where the electro-magnetically operated devices are direct current relays 46, 47, the operating coils 48 and 49 of the two relays are connected in series across the two line wires 50 and 51, their common terminals being connected to earth through a common wire and earth terminal 52. Half-wave polarising rectifiers 53 and 54 are connected one in series with each of the operating coils 48 and 49 and are so poled that current from any one line wire can flow through only one of the two relays. So-called "free-wheeling" rectifiers 55 and 56 are connected one across the operating coil of each relay for the purpose stated above. With this arrangement, an earth fault occurring on the line wire 51 causes leakage current to flow during one half of its alternating current cycle from the other line wire 50, through the rectifier 53 and the relay operating coil 48, and thence by way of the common earth connection earth terminal 52 and earth fault to the line wire 51, the relay 46 thus operating to complete an energising circuit for a warning lamp 57.

On the other hand an earth fault occurring on the line wire 50 causes current during one half of its alternating current cycle to flow from the line wire 51 through the rectifier 54 and the relay operating coil 49, and thence by way of the common earth connection, the earth terminal 52 and the earth fault to the line wire 50 the relay 47 thus operating to complete an energising circuit for a warning lamp 58.

Referring to Figure 4 each relay has, in addition, a holding winding, these holding windings 59 and 60 being energised in series from a rectifier 61 connected across the line wires 50 and 51 in series with a current limiting resistance 62. The holding windings 59 and 60 of the relays are normally short circuited by a normally closed contact 63 and 64 on the associated relays so that each holding winding is energised only when its relay has been energised in consequence of the occurrence of a fault and prevents it dropping away, even though the fault is cleared, until the holding circuit is broken, as by a manually operated reset button 65.

The above described embodiments of the invention if made very sensitive are apt to be affected by line capacity when this is too great, to the extent that an indication of a fault on one line may be given when in fact it is on the other line. Where, however, such a state of affairs is not objectionable or where a high sensitivity is not required, the apparatus according to the invention is found to be most reliable.

It is evident that a number of alterations and additions may be made to the arrangements above described and illustrated in the accompanying drawings in order to meet particular requirements or conditions, such as, for example, additional contacts on the relays to operate the trip mechanism of the line circuit breakers or audible warning devices.

Having thus described our invention what we claim is:

1. Apparatus for the detection of earth faults in two-wire alternating current electric supply systems of which neither line wire is normally earth connected, comprising in combination, a first relay and a second relay, each having an operating winding; a first polarising rectifier and a second polarising rectifier; an earth connection; a first series circuit including said earth connection, said operating winding of said first relay said first polarising rectifier and one of said line wires; a second series circuit including said earth connection, said operating winding of said second relay, said second polarising rectifier and the other of said line wires, said polarising rectifier being so poled that current flowing through an earth fault on one line wire will be passed by one of said rectifiers, and current flowing through an earth fault on the other line wire will be passed by the other of said rectifiers; and means associated with each relay when the operating winding thereof becomes energised to maintain it energised during the half cycle when its associated polarising rectifier is non-conductive.

2. Apparatus for the detection of earth faults in two-wire alternating current electric supply systems of which neither line wire is normally earth connected, comprising in combination, a first relay and a second relay, each having an operating winding, a holding winding, a first normally closed contact and a second normally closed contact, said first contacts, when closed, short circuiting said holding windings respectively; an earth connection; a reset button having two normally closed contacts; a source of direct current; a first polarising rectifier and a second polarising rectifier; a first series circuit including said earth connection, one of said contacts of said reset button, said second contacts of said relays, said operating winding of said first relay, said first polarising rectifier and one of said line wires; a second series circuit including said earth connection, said one of said contacts of said reset button, said second contacts of said relays, said operating winding of said second relay, said second polarising rectifier and the other of said line wires, said polarising rectifiers being so poled that current flowing through an earth fault on one line wire will be passed by one of said rectifiers, and current flowing through an earth fault on the other line wire will be passed by the other of said rectifiers; and a third series circuit including said source of direct current, the other of said contacts of said reset button and said holding windings.

References Cited in the file of this patent

UNITED STATES PATENTS

| | | |
|---|---|---|
| 1,914,220 | Sorensen | June 13, 1933 |
| 2,022,758 | Corderman | Dec. 3, 1935 |
| 2,027,701 | Rees | Jan. 14, 1936 |